United States Patent
Wiley et al.

(10) Patent No.: US 6,516,085 B1
(45) Date of Patent: Feb. 4, 2003

(54) APPARATUS AND METHODS FOR COLLECTING GLOBAL DATA DURING A RETICLE INSPECTION

(75) Inventors: James N. Wiley, Menlo Park, CA (US); Jun Ye, Palo Alto, CA (US); Shauh-Teh Juang, Saratoga, CA (US); David S. Alles, Los Altos, CA (US); Yen-Wen Lu, Los Altos, CA (US); Yu Cao, Sunnyvale, CA (US)

(73) Assignee: KLA-Tencor, San Jose, CA (US)

( * ) Notice: Subject to any disclaimer, the term of this patent is extended or adjusted under 35 U.S.C. 154(b) by 0 days.

(21) Appl. No.: 09/304,437

(22) Filed: May 3, 1999

(51) Int. Cl.$^7$ .................................................. G06K 9/00
(52) U.S. Cl. ........................................ 382/144; 348/87
(58) Field of Search ......................... 382/141, 143–151; 348/86, 87, 125, 126; 250/559.46; 356/237.1, 239.1, 239.3, 237.4, 237.5

(56) References Cited

U.S. PATENT DOCUMENTS

| | | | |
|---|---|---|---|
| 4,587,617 A | * 5/1986 | Barker et al. | 382/149 |
| 5,619,429 A | 4/1997 | Aloni et al. | |
| 5,804,340 A | 9/1998 | Garza et al. | |
| 5,814,829 A | * 9/1998 | Broude et al. | 250/559.46 |
| 6,047,083 A | * 4/2000 | Mizuno | 382/141 |

OTHER PUBLICATIONS

Barry Simon, Javier Prado, and Larry Day, "Software Tools For Analysis of Water Sort Yield Data", 1987 Test Conference, paper 28.1, presented by Motorola, Inc., Memory Products Division, Austin, Texas, 10 pages.

* cited by examiner

Primary Examiner—Joseph Mancuso
Assistant Examiner—Vikkram Bali
(74) Attorney, Agent, or Firm—Beyer, Weaver & Thomas, LLP.; Mary R. Olynick, Esq.

(57) ABSTRACT

Disclosed is a method of inspecting a reticle defining a circuit layer pattern that is used within a corresponding semiconductor process to generate corresponding patterns on a semiconductor wafer. A test image of the reticle is provided, and the test image has a plurality of test characteristic values. A baseline image containing an expected pattern of the test image is also provided. The baseline image has a plurality of baseline characteristic values that correspond to the test characteristic values. The test characteristic values are compared to the baseline characteristic values such that a plurality of difference values are calculated for each pair of test and baseline characteristic values. Statistical information is also collected.

29 Claims, 7 Drawing Sheets

APPARATUS AND METHODS FOR COLLECTING GLOBAL DATA DURING A RETICLE INSPECTION

BACKGROUND OF THE INVENTION

The present invention relates generally to integrated circuit design and fabrication systems. More specifically, the invention relates to mechanisms for inspecting reticles.

Generation of reticles and subsequent optical inspection of such reticles have become standard steps in the production of semiconductors. Initially, circuit designers provide circuit pattern data, which describes a particular integrated circuit (IC) design, to a reticle production system, or reticle writer. The circuit pattern data is typically in the form of a representational layout of the physical layers of the fabricated IC device. The representational layout typically includes a representational layer for each physical layer of the IC device (e.g., gate oxide, polysilicon, metallization, etc.), wherein each representational layer is composed of a plurality of polygons that define a layer's patterning of the particular IC device.

The reticle writer uses the circuit pattern data to write (e.g., typically, an electron beam writer or laser scanner is used to expose a reticle pattern) a plurality of reticles that will later be used to fabricate the particular IC design. A reticle inspection system may then inspect the reticle for defects that may have occurred during the production of the reticles.

A reticle or photomask is an optical element containing at least transparent and opaque regions, and sometimes semi-transparent and phase shifting regions, as well, which together define the pattern of coplanar features in an electronic device such as an integrated circuit. Reticles are used during photolithography to define specified regions of a semiconductor wafer for etching, ion implantation, or other fabrication process. For many modern integrated circuit designs, an optical reticle's features are between about 1 and about 5 times larger than the corresponding features on the wafer. For other exposure systems (e.g., x-ray, e-beam, and extreme ultraviolet) a similar range of reduction ratios also apply.

Optical reticles are typically made from a transparent medium such as a borosilicate glass or quartz plate on which is deposited an opaque and/or semi-opaque layer of chromium or other suitable material. However, other mask technologies are employed for direct e-beam exposure (e.g., stencil masks), x-ray exposure (e.g., absorber masks), etc. The reticle pattern may be created by a laser or an e-beam direct write technique, for example, both of which are widely used in the art.

After fabrication of each reticle or group of reticles, each reticle is typically inspected by illuminating it with light emanating from a controlled illuminator. A test image of a portion of the reticle is constructed based on the portion of the light reflected, transmitted, or otherwise directed to a light sensor. Such inspection techniques and apparatus are well known in the art and are embodied in various commercial products such as many of those available from KLA-Tencor Corporation of San Jose, Calif.

During a conventional inspection process, the test image of the reticle is typically compared to a baseline image. Typically, the baseline image is either. generated from the circuit pattern data or from an adjacent die on the reticle itself. Either way, the test image features are analyzed and compared with corresponding features of the baseline image. That is, an edge position within the test image is subtracted from a corresponding edge position within the baseline image to calculate a difference value. Each difference value is then compared with a predetermined threshold value. If the test image feature varies from the baseline feature by more than the predetermined threshold, a defect is defined and an error is reported.

An error report for a particular test image will typically only include a list of errors that were detected within the particular test image and corresponding reticle (e.g.,. the location of each error and a small image of that defect). In other words, the list represents the features within the test image that varied from the baseline image by more than the predetermined threshold. Specifically, the list represents the edge positions within the test image that varied more than the predetermined threshold from the corresponding edge positions of the baseline image, as well as any extra or missing features.

Although conventional inspection techniques provide adequate error data in some applications, this data proves limiting under certain conditions. For example, a user of the reticle may wish to know the actual measured values of particular characteristics of features (i.e., edge position) within the test image as a function of position on the reticle. Additionally, the user may wish to know other measurable values of other characteristics (e.g. line width and corner rounding values). By way of another example, the user may wish to know the amount of variance between them features of the test image and the features of the baseline image as a function of position on the reticle.

Although these variance values may not be large enough to be defined as errors, they may be useful in process control and/or monitoring. Additionally, statistical information of measurable characteristics as a function of position on the reticle, for example, may be used to increase the sensitivity of the inspection process itself, among other applications. That is, the threshold may be adjusted for certain areas of the reticle that typically have more errors than other areas of the reticle. Unfortunately, conventional inspection apparatus and techniques merely provide a list of errors present on the reticle and do not provide any statistical information of measured characteristics of the reticle.

Thus, inspection apparatus and techniques for improving and enhancing information that is output from the inspection procedure are needed. More specifically, inspection mechanisms for providing statistical information about measured characteristics of the reticle are needed.

SUMMARY OF THE INVENTION

Accordingly, the present invention addresses the above problems by providing apparatus and methods for providing statistical information during the inspection process. As each feature or region of a test image of a portion of a reticle is evaluated, statistical information is collected for the entire test image. That is, as features of the test image are compared to features of the baseline image, measured characteristic values of the test image (or difference values between the test and baseline images) are collected. The collected measured or difference values may be correlated to a number of reticle parameters, such as a reticle position, a particular area on the reticle, a feature density value of a particular area of the reticle, or a process associated with the reticle under test. A count of the measured characteristic or difference values may also be collected. This collected data (e.g., the count and measured values or difference values) may then be used to compute other statistical parameters, such as standard deviation, minimum, maximum, range (maximum minus minimum), and median or average values.

In one embodiment, a method of inspecting a reticle defining a circuit layer pattern that is used within a corresponding semiconductor process to generate corresponding patterns on a semiconductor wafer is disclosed. A test image of the reticle is provided, and the test image has a plurality of test characteristic values. A baseline image containing an expected pattern of the test image is also provided. The baseline image has a plurality of baseline characteristic values that correspond to the test characteristic values. The test characteristic values are compared to the baseline characteristic values such that a plurality of difference values are calculated for each pair of test and baseline characteristic values. Statistical information is also collected.

In a specific embodiment, the statistical information includes a second plurality of test characteristics values that are of a different type of characteristic than the first plurality of test characteristic values that are compared to the baseline characteristic values. The statistical information may also include a standard deviation value of the second test characteristic values, a median value of the second test characteristic values, and/or an average value of the second test characteristic values. The first test characteristic values may be in the form of edge position values and the second test characteristic values include line width values, corner rounding values, transmission values, gate line width values, contact area values, and/or misalignment values.

In another embodiment, a method of monitoring or adjusting a reticle process that is used to generate reticles is disclosed. The method includes (a) generating a first reticle using a reticle process; (b) providing a test image of the first reticle, wherein the test image has a plurality of test characteristic values; (c) providing a baseline image containing an expected pattern of the test image, wherein the baseline image has a plurality of baseline characteristic values that correspond to a first subgroup of the test characteristic values; (d) comparing the first subgroup of test characteristic values to the corresponding baseline characteristic values such that a plurality of difference values are calculated for each pair of test and baseline characteristic values; (e) collecting statistical information based on a second subgroup of the test characteristic values of the first reticle; and (f) adjusting a process parameter of the reticle process if the statistical information indicates that the second subgroup of test characteristic values deviate from the baseline values by more than a predetermined amount.

In one aspect, the first subgroup is equal to the second subgroup of test characteristic values. In yet another embodiment, the above operations (a) through (e) are repeated for a second reticle. The statistical information for the second reticle is compared to the statistical information for the first reticle, and a process parameter of the reticle process is adjusted if the statistical information for the second reticle varies from the statistical information for the first reticle by more than a second predetermined amount. In yet another embodiment, the process parameter of the reticle process is adjusted so as to reduce variations in the second subgroup of test characteristic values as a function of reticle position.

In another method aspect, a semiconductor process is monitored or adjusted. A reticle defining a circuit layer pattern and statistical information about selected characteristic values of the circuit layer pattern are provided. A circuit layer on a semiconductor wafer is generated using the reticle in a photolithography process. The resulting circuit layer is inspected based at least in part on the statistical information.

In yet another aspect, a computer readable medium containing program instructions for inspecting a reticle defining a circuit layer pattern that is used within a corresponding semiconductor process to generate corresponding patterns on a semiconductor wafer is also disclosed. The computer readable medium includes computer readable code for (i) providing a test image of the reticle, wherein the test image having a plurality of test characteristic values, (ii) providing a baseline image containing an expected pattern of the test image, wherein the baseline image having a plurality of baseline characteristic values that correspond to the test characteristic values, (iii) comparing the test characteristic values to the baseline characteristic values such that a plurality of difference values are calculated for each pair of test and baseline characteristic values, (iv) collecting statistical information, and a computer readable medium for storing the computer readable codes.

In yet another embodiment, a computer readable medium containing program instructions for monitoring or adjusting a semiconductor process is disclosed. The computer readable medium includes computer readable code for providing a reticle defining a circuit layer pattern, computer readable code for providing statistical information about selected characteristic values of the circuit layer pattern, computer readable code for generating a circuit layer on a semiconductor wafer using the reticle in a photolithography process, computer readable code for inspecting the resulting circuit layer based at least in part on the statistical information, and a computer readable medium for storing the computer readable codes.

In another embodiment, a computer readable medium containing program instructions for monitoring or adjusting a reticle process is also disclosed. The computer readable medium includes computer code for (a) generating a first reticle using a reticle process, (b) providing a test image of the first reticle, wherein the test image has a plurality of test characteristic values, (c) providing a baseline image containing an expected pattern of the test image, wherein the baseline image has a plurality of baseline characteristic values that correspond to the test characteristic values, (d) comparing the test characteristic values to the baseline characteristic values such that a plurality of difference values are calculated for each pair of test and baseline characteristic values, (e) collecting statistical information based on the plurality of test characteristic values of the first reticle, and (f) adjusting a process parameter of the reticle process if the statistical information indicates that the test characteristic values deviate from the baseline characteristic values by more than a predetermined amount.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to the specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
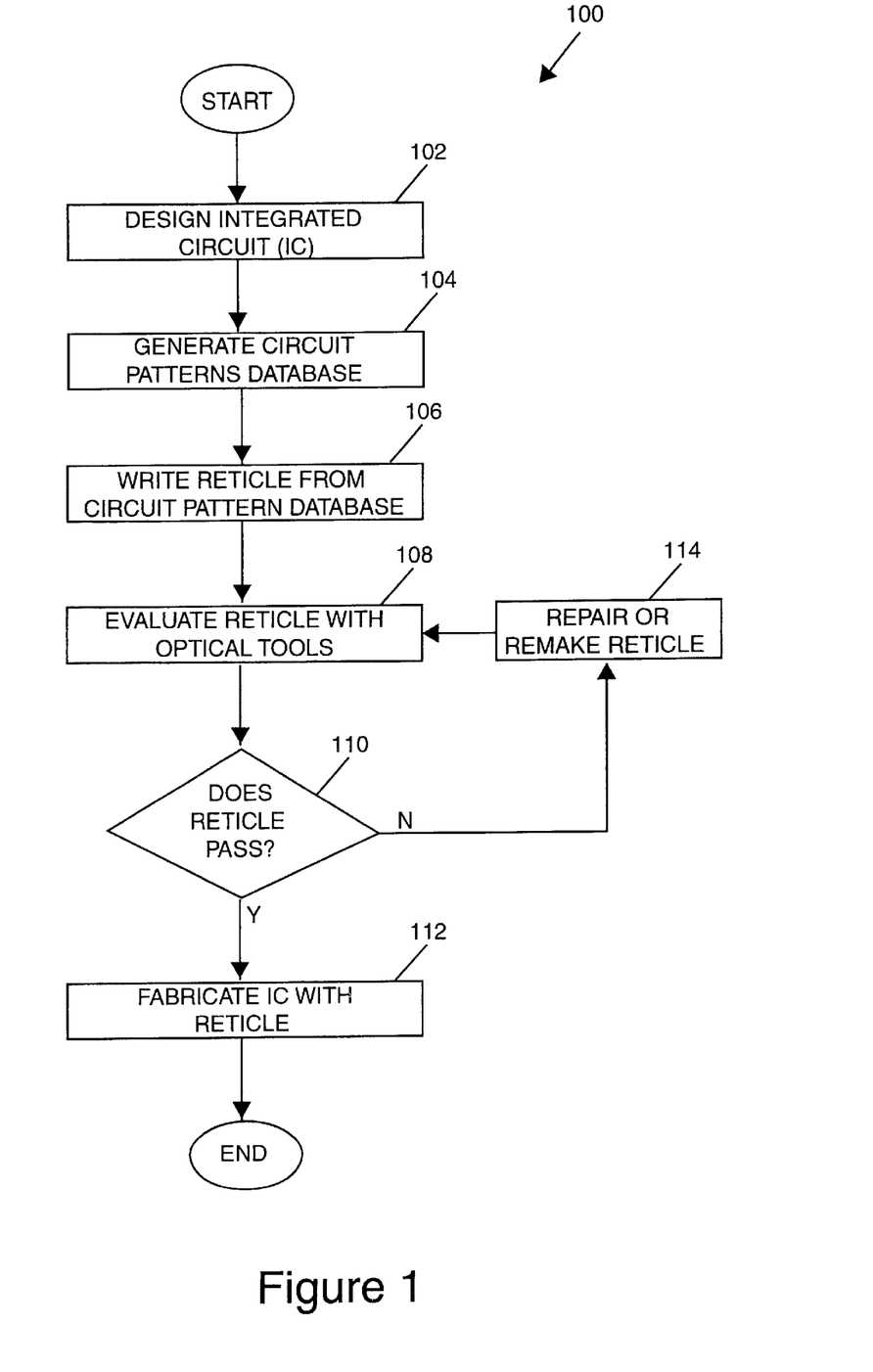
FIG. 1 is a flowchart illustrating an integrated circuit design process in accordance with one embodiment of the present invention.

FIG. 1 is a flowchart illustrating an integrated circuit design process 100 in accordance with one embodiment of the present invention. Initially, in operation 102, an integrated circuit (IC) device is designed using any suitable design techniques. For example, an IC designer may use preexisting schematic library blocks to form the IC device using, for example, electronic design automation (EDA) tools. In some cases, the IC designer may create the IC device or part of the IC device from scratch with the aid of any suitable design system, such as conventional computer aided design (CAD) tools. For example, the IC designer may use a schematic CAD tool to plan the logic diagrams for a particular IC device. Still further, the IC designer may write a description of the IC device or portions of the IC device with the aid of a hardware design language, such as VHDL.

Next, in operation 104 the IC designer generates a circuit pattern database (commonly referred to as a "layout") from the IC design in operation 104. The circuit pattern database is composed of a plurality of electronic representations of layout patterns for IC layers that are later converted into a plurality of reticles that are used to fabricate a plurality of physical layers of an IC device. Each physical layer of the fabricated IC device corresponds to one of the reticles and an associated one of the electronic representations of the circuit pattern database. For example, one electronic representation may correspond to a diffusion pattern on a silicon substrate, another to a gate oxide pattern, another to a gate polysilicon pattern, another to a contact pattern on an interlayer dielectric, another to a line pattern on a metallization layer, and so on. Each electronic representation is composed of a plurality of polygons or other shapes (herein, referred to as "figures"), which together define the reticle pattern.

The circuit pattern database may be generated using any suitable technique, for example, by using EDA or CAD tools. For example, the IC designer may manually lay out the circuit patterns for the IC device with or without preexisting library cells. Alternatively, a synthesis tool may automatically create circuit patterns for the IC device from scratch or by piecing together preexisting library cells.

After the circuit pattern database is generated, the circuit pattern database is used to produce a plurality of reticles in operation 106. The reticles may be produced by any suitable pattern generator or reticle writer equipment, such as a MEBES" 4500, commercially available from ETEC of Hayward, Calif.

Each reticle corresponds to one or more electronic representation(s) from the circuit pattern database. A reticle is then inspected in operation 108, and it is determined whether the reticle passes inspection in operation 110. If the reticle passes inspection, the reticle may then be used to fabricate a physical layer of the IC device in operation 112. However, if the reticle does not pass inspection, the reticle is either repaired or remade in operation 114, and the new reticle is inspected in operation 108. Operations 106 through 112 may be implemented for some or all of the electronic representations of the circuit pattern database.

The present invention may be implemented on any suitable inspection tools. For example, a KLA 301, 351, or 353UV Reticle Inspection Tool, commercially available from KLA-Tencor of San Jose, Calif., may be employed. One embodiment of an inspection system is described below in reference to FIG. 8.

Figure 2:
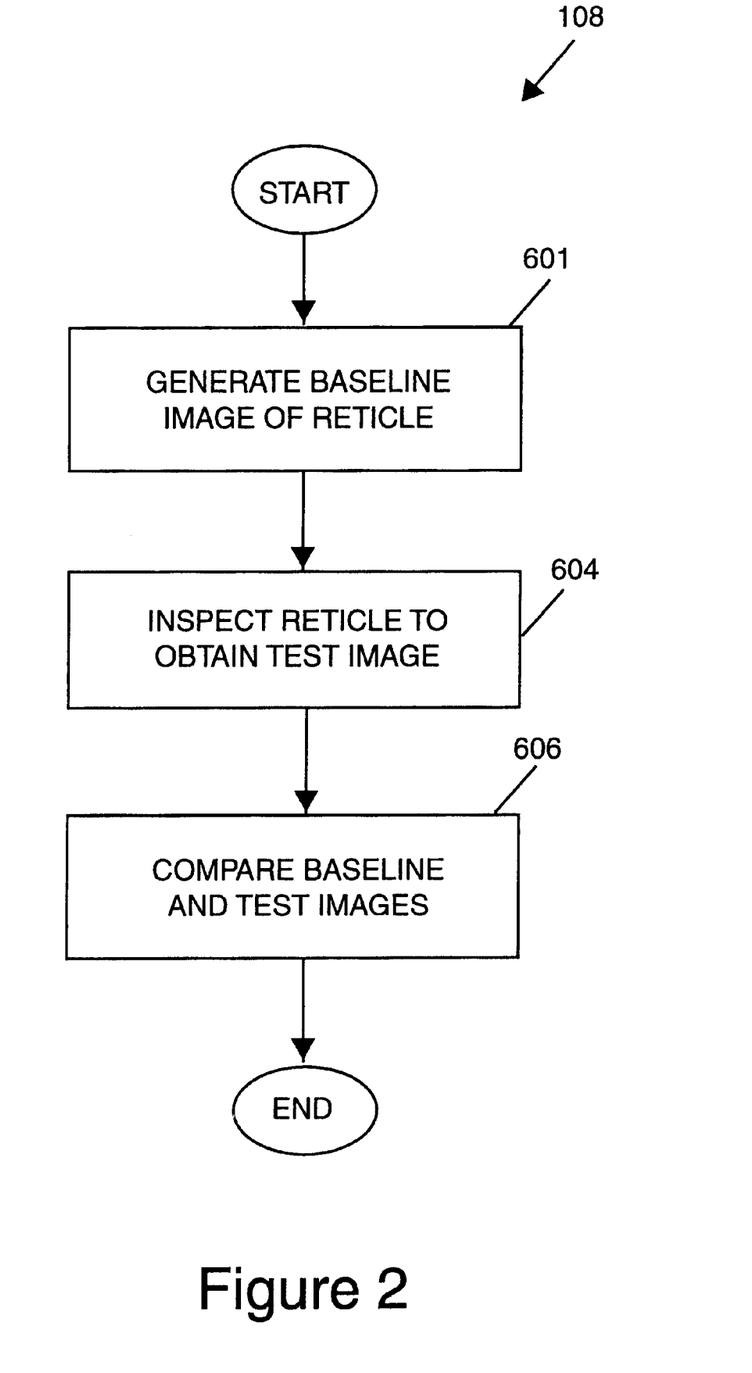
FIG. 2 is a flowchart illustrating the operation of FIG. 1 of inspecting and evaluating the fabricated reticle in accordance with one embodiment of the present invention.

FIG. 2 is a flowchart illustrating the operation 108 of FIG. 1 of evaluating the fabricated reticle in accordance with one embodiment of the present invention. Initially, in operation 601 a baseline image of the reticle may be generated or "rendered" from the provided circuit pattern database. The baseline image may be generated in any suitable manner, such as by merely directly converting the contents of the circuit pattern database into an image. Alternatively, the circuit pattern database may be rendered by simulating fabrication results from making a reticle that perfectly matches the circuit pattern database. For example, the corners of a circuit pattern in the baseline image may be rounded to account for corner rounding that commonly occurs during fabrication of a reticle. The baseline image may also include simulated optical effects from retrieving an optical image of the simulated reticle. Such optical effects are necessarily encountered when an optical inspection technique is used to evaluate a reticle.

Alternatively, the baseline image may be generated from an adjacent die of the reticle in a die-to-die inspection approach. In this approach, the images of two supposedly identical patterns on a reticle are generated, one for a baseline image and one for a test image described below. Note that many reticles contain the layout patterns of multiple identical (and adjacent) die.

After the baseline image has been provided at operation 601, the reticle is inspected to obtain a test image of the reticle or a portion of the reticle under analysis in operation

604. Any suitable mechanism may be implemented for obtaining the test image. For example, an optical or ebeam image be obtained.

In operation 606, the test image is compared to the baseline image. The comparison may include any suitable techniques for analyzing the reticle. As described above, a measured characteristic value of the test image may be compared to a corresponding characteristic value of the baseline image. For example, a line width value of the test image may be compared to a line width value of the baseline image. Several embodiments of comparison techniques are described in U.S. patent application Ser. No. 09/213,744, entitled "Mechanisms for Making and Inspecting Reticles" by Glasser, et al., filed on Dec. 17, 1998, which is herein incorporated by reference in its entirety.

Figure 3:
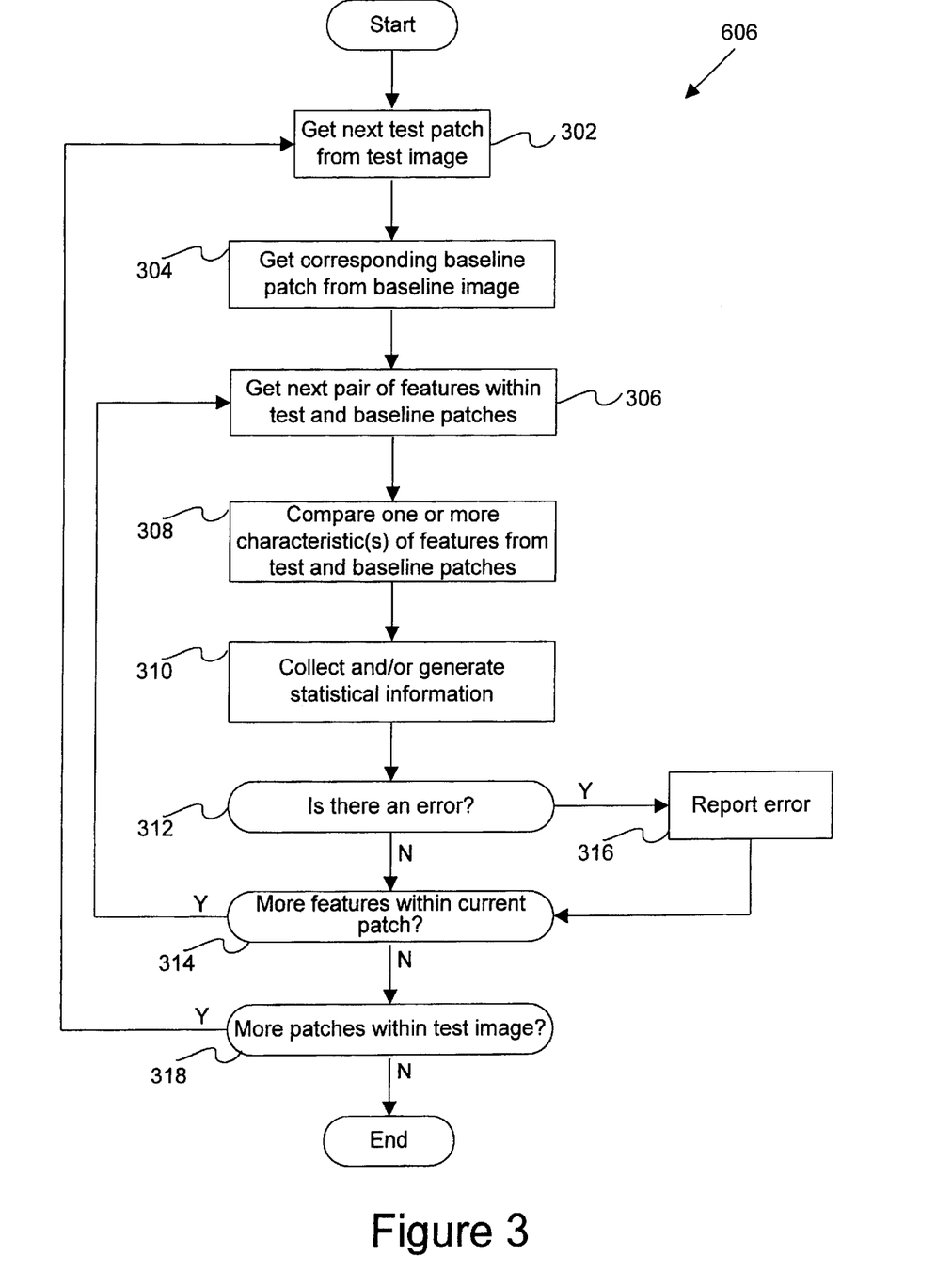
FIG. 3 is a flowchart illustrating the operation of FIG. 2 of comparing the test and baseline images in accordance with one embodiment of the present invention.

FIG. 3 is a flowchart illustrating the operation 606 of FIG. 2 of comparing the baseline and test images in accordance with one embodiment of the present invention. Generally, the test image may be divided into a plurality of regions (herein referred to as "patches") that are analyzed separately during the inspection process. Each patch may be any suitable size for efficiently analyzing the test image. For example, processing resources may be limited and require a relatively small patch size. In one embodiment, the patch is about 100 by 25 µm.

Initially, a first test patch is obtained from the test image in operation 302. A corresponding baseline patch is also obtained from the baseline image in operation 304. In other words, the baseline image may also be divided into a plurality of patches such that each baseline patch may be compared to each test patch. In operation 306, a pair of features are obtained from the test and baseline patches. That is, a feature is obtained from the test patch, and a corresponding feature is obtained from the baseline patch.

One or more characteristics of the feature from the test and baseline patches are then compared in operation 308. The characteristics may be any measurable characteristic that is suitable for analyzing the sample. Some examples of measurable characteristics are line width, comer rounding, transmission, gate-line width, contact area, and alignment characteristics. Several embodiments of techniques for comparing different characteristics are further described in reference to FIGS. 4 through 7.

Statistical information is then collected and/or generated based on comparison results in operation 310. For example, as features are analyzed and compared, measured values of particular characteristics of the test image (e.g., line width or comer rounding measurements) may be collected. The statistical information may also include difference values between the characteristic values of the test image and the baseline image. A standard deviation, median, average, maximum, minimum, and/or range (maximum minus minimum) value of a particular characteristic's measured or difference values may also be calculated and stored in operation 310.

Statistical information may be collected as a function of position on the reticle, as well as a function of any other suitable parameter. For example, measured or difference values for a given characteristic (e.g., line width) may be collected and correlated with feature density of particular areas of the reticle. That is, measured or difference values may be correlated with different regions of the patch or reticle that have different density values. By way of another example, statistical information may be collected as a function of a process type that corresponds to the reticle under test. In other words, statistical information for a particular characteristic is recorded for several reticles as a function of reticle type.

Likewise, other statistical information may be calculated as a function of any suitable reticle parameter. For example, average, median, maximum, minimum, range, and/or standard deviation values may be calculated as a function of reticle region, feature density value, and/or a process associated with the reticle. By way of specific example, a single average characteristic or difference value may be calculated for an entire reticle. Thus, average characteristic values may be compared between different reticles and/or associated processes.

Alternatively, an average characteristic or difference value may be calculated for particular regions of the reticle. These average values may then be correlated to other reticle parameters associated with the particular regions of the reticle, such as feature density or region orientation (e.g., a region that is positioned within the outer part of the reticle versus a region that is positioned within the inner portion).

This information may be calculated on the fly as the characteristic values are compared, or calculated after all comparisons are complete. In the later embodiment, a count is retained of the number of characteristic or difference values such that certain statistical information may be calculated, such as average, median, maximum, minimum, range, and/or deviation values.

After statistical information is collected, it may be then be determined whether there is an error in operation 312. In other words, it is determined whether the test feature's measured characteristic varies from the baseline feature's corresponding characteristic by more then a predetermined threshold. If an error is present, the error may be reported in operation 316. If there is no error present, it is then determined whether there are more features to analyze within the current patch in operation 314.

If there are more features, a next pair of features are obtained in operation 306, and compared in operation 308. Operation 306 and 308 are repeated for the remaining features within the current patch. If it is determined that there are not more features to analyze within the current patch, it is then determined whether there are more patches to analyze within the test image in operation 318. If there are more patches to analyze, the entire process 606 is repeated. If there are no more patches to process, the process ends.

As mentioned above, several different measured characteristics may be included within the analysis of the reticle. Each measured characteristic of the test image may be compared to a corresponding characteristic of the baseline image. These comparisons may result in an error being reported. As characteristics are compared, statistical information may be compiled regarding the measured characteristics. The statistical information may include characteristics that were compared, as well as characteristics that were not compared. That is, statistical information may be generated for any number and type of measurable characteristics.

Figure 4:
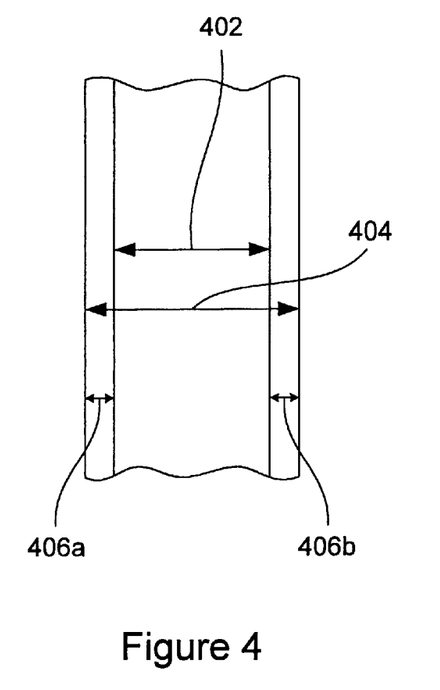
FIG. 4 is a diagrammatic representation of line width characteristics of a test image and corresponding baseline image in accordance with one embodiment of the present invention.

FIG. 4 is a diagrammatic representation of line width characteristics of a test image and corresponding baseline image in accordance with one embodiment of the present invention. As shown, a line width 402 of a feature within the test image is compared to a corresponding line width 404 of the base line image. If the differences between the line width value (represented by 406a and 406b) are greater then a predetermined threshold value, an error may be defined and reported.

Whether or not the line width values are compared and/or an error is reported, statistical information about the line width values may be collected and/or generated. For example, the actual line width value 402 of the test image may be stored. Additionally, the difference values 406a and 406b between the line width of the test image and baseline image may be stored. Additionally or alternatively, an average line width value, a median line width value, a maximum line width value, a minimum line width value, a range line width value (maximum minus minimum), and/or a standard deviation value may be calculated as multiple line widths are analyzed or after all line widths are analyzed.

Figure 5:
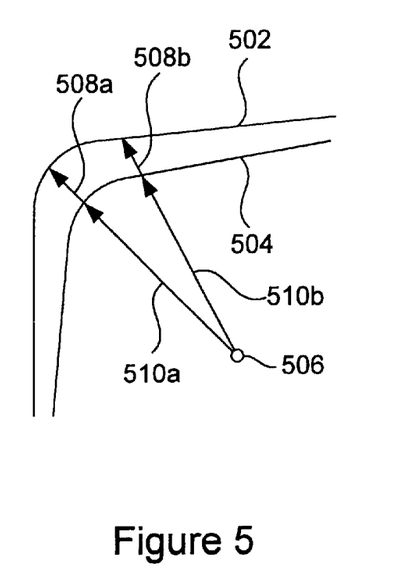
FIG. 5 is a diagrammatic representation of corner rounding characteristics of a test image and corresponding baseline image in accordance with one embodiment of the present invention.

FIG. 5 is a diagrammatic representation of corner rounding characteristics of a test image and corresponding baseline image in accordance with one embodiment of the present invention. As shown, a corner 504 of the test image has a number of associated radii 510. Likewise, a corner 502 of the corresponding baseline image has a number of associated radii 508.

Each of the radii 510 of the test image may be compared to an associated radii 508 of the baseline image. For example, radii 408A of the baseline image may be compared to radii 510a of the test image. If the test image radii varies from the corresponding baseline radii by more than a predetermined threshold, an error may be flagged. As in a line width analysis, the actual radii values of the test image and/or computed differences between the radii of the test and baseline images may be stored. Additionally or alternatively, other statistical information may be generated and stored. For example, a standard deviation, average, maximum, minimum, range, and/or median value may be calculated and stored for the various radii or difference values as a function of position on the reticle.

By way of another example, a transmission percentage value may be analyzed for a given portion of the test image and corresponding reticle. The transmission percentage value represents the amount of light that is able to penetrate a portion of the reticle. For example, a zero percent transmission value indicates that no light may pass through the reticle portion, while a 100 percent value indicates that all light may pass through the reticle portion. A percentage value that is between zero and 100 indicates that some light is blocked in the reticle portion.

The transmission value may be useful for determining whether the reticle have a stain or water mark on a portion of the reticle that normally has a 100 percent transmission value. Additionally, the transmission percentages of particular areas of the reticle (e.g., areas that are expected to have 100 percent transmission) may be combined into statistical information. For example, an average transmission value may be determined, along with standard deviation values.

Another characteristic of the test image that may be analyzed is contact area size. The amount of energy throughput for a given contact depends at least, in part, on the contact area size. Thus, one may wish to determine whether contacts as represented within the test image have at least a minimum area size.

Figure 6A:
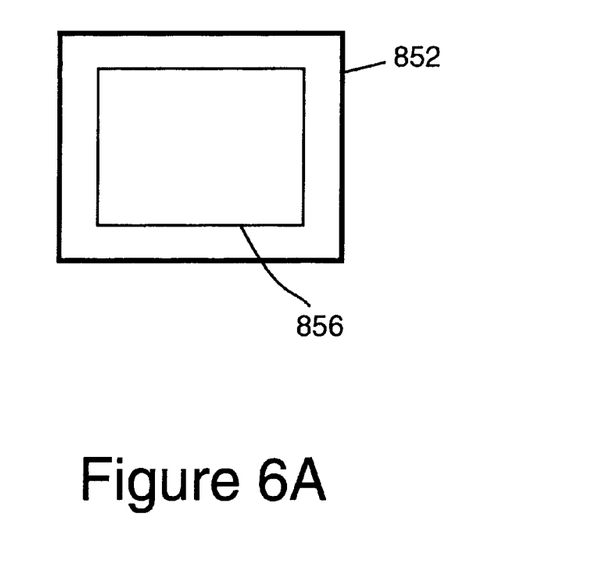
FIGS. 6A and 6B are diagrammatic representations of contact area characteristics of a test image and corresponding baseline image in accordance with one embodiment of the present invention.
Figure 6B:
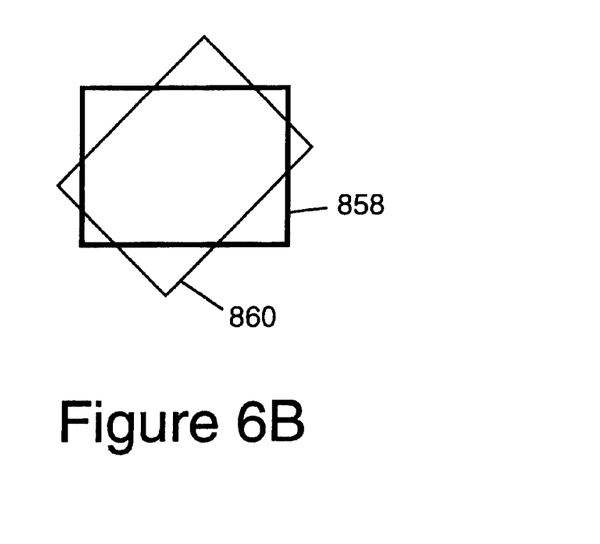

FIGS. 6A and 6B are diagrammatic representations of contact area characteristics of a test image and corresponding baseline image in accordance with one embodiment of the present invention. As shown in FIG. 6A, a test contact 856 has a relatively smaller sized area than a baseline contact 852. In contrast, as shown in FIG. 6B, a test contact 860 has a same area size as a corresponding baseline contact 858.

If the difference in contact areas between the test contact and baseline contact is more than a predetermined threshold, an error may be reported (e.g., an error may be reported for the contacts of FIG. 6A, but not FIG. 6B). Additionally, the actual contact area dimensions and/or difference values may be collected, even when an error is not reported. The stored contact area dimensions and/or difference values may then be combined with other contact area dimensions and/or difference values to generate meaningful statistical data for the reticle under test. For example, mean and/or standard deviation values may be calculated for contact area sizes on a particular reticle or differences in contact area sizes of the test and baseline images.

Another characteristic that may be analyzed and collected during the inspection process is alignment or misalignment measurements between a first group of features and a second group of features. That is, during reticle generation, groups of features may be misaligned with other groups of features on the reticle.

Figure 7:
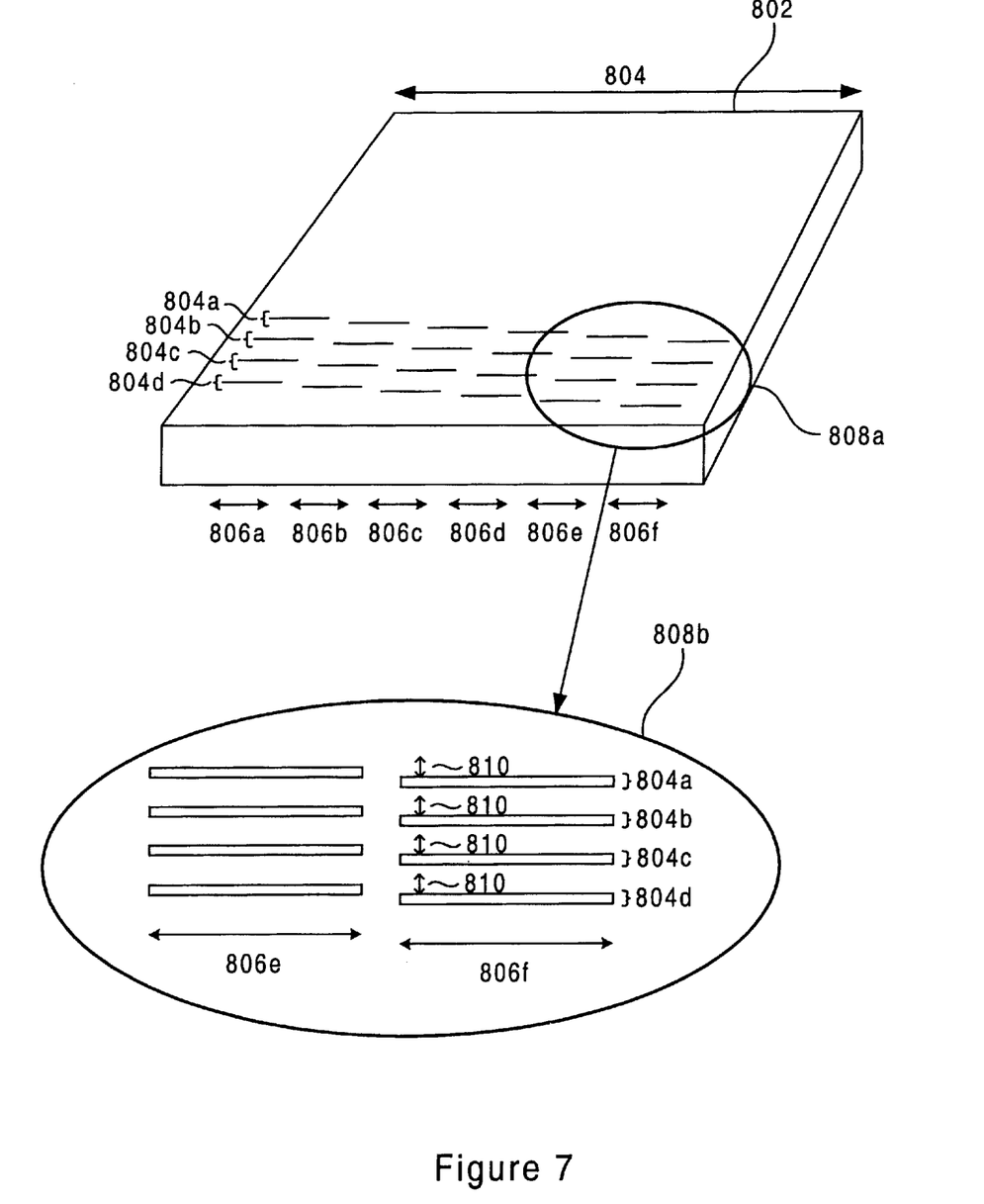
FIG. 7 is a diagrammatic representation of alignment characteristics of a test image and corresponding baseline image in accordance with one embodiment of the present invention.

FIG. 7 is a diagrammatic representation of misalignment characteristics of a test image and corresponding baseline image in accordance with one embodiment of the present invention. A reticle under test 802 includes a plurality of fine patterns (e.g., in columns 806 and rows 804) that are used to fabricate a particular layer of a semiconductor device. Ideally, these fine patterns on the reticle should correspond to the circuit design data that was used to generate the reticle (and possibly also the baseline image. However, as the reticle patterns are being written onto the reticle, misalignment may occur between two or more groups of patterns.

As shown, each columns of patterns is misaligned from the adjacent column of patterns. For example, column 806f is vertically misaligned from column 806e. A magnified view 808b is also illustrated for columns 806f and 806e. As shown, row 804d of column 806f is misaligned from row 804d of column 806e by amount 810.

When the features of a test image that is generated from reticle 802 are compared to features of a baseline image (e.g., in an edge to edge analysis), statistical information for any misalignment within the reticle may be collected and stored for later analysis. This statistical information may be useful even when an error is not detected. For example, this misalignment information may indicate that the reticle writer is becoming increasingly misaligned. Thus, statistical information for misalignment for a group of reticles that were produced with a same reticle writer may be collected and analyzed to determined whether the misalignment is increasing for each generated reticle.

The techniques of the present invention have several advantages. For example, since statistical information is collected and stored for one or more characteristics of the reticle, the reticle may be globally analyzed in many useful applications. In a process monitoring application, the statistical information may allow process engineers to more accurately monitor their semiconductor process. By way of a specific example, it may be determined whether deviations between measurements of a particular characteristic on the wafer itself, such as line width, are a result of the reticle or of a particular process step. Additionally, the process may be adjusted for particular portions of the reticle to compensate for the reticle deviations. In sum, the present invention facilitates monitoring and fine tuning of the semiconductor process.

In a reticle generation application, the statistical information may be utilized to fine tune the reticle writing process. That is, the information may be analyzed to determine problem areas within the reticle writing process. The reticle writing process may then be adjusted for those particular problem areas. Additionally, the statistical information may be utilized to increase the sensitivity of a threshold value that is used to inspect a particular problem region of the reticle.

Also, statistical information may be collected for a same reticle process for several reticles and analyzed to determine if there are any significant trends within the statistical information. These trends may indicate that the reticle writing process, for example, is beginning to vary towards unacceptable results. In other words, the statistical information for a plurality of reticles may allow prediction of errors in the reticle generation process.

Figure 8:
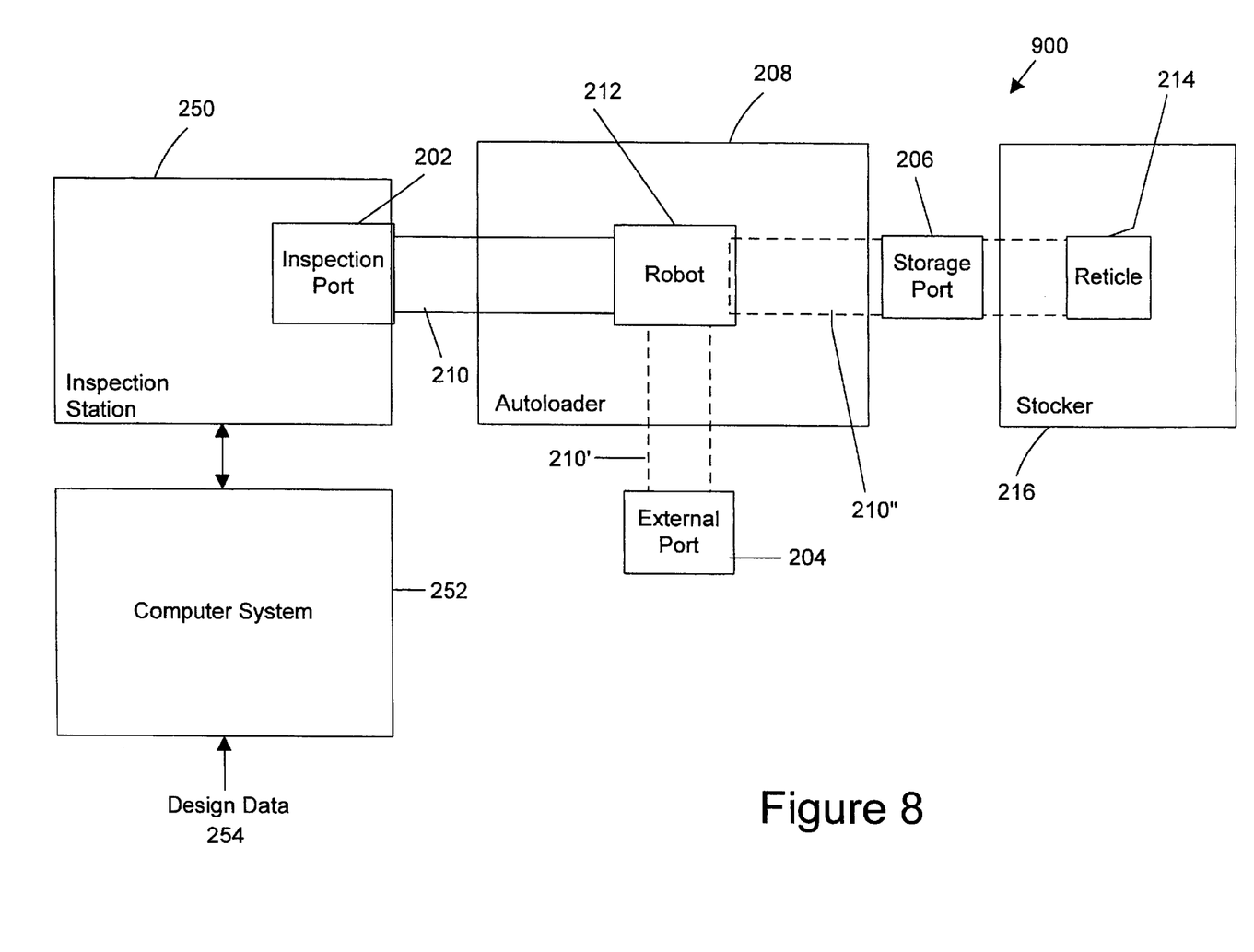
FIG. 8 shows a reticle inspection system upon which the process of FIG. 1 of evaluating the reticle is implemented in one embodiment of the present invention.

The invention may be used with any suitable inspection or fabrication system. FIG. 8 shows a reticle inspection system 900 where process 108 of FIG. 1 of evaluating the reticle is implemented in one embodiment of the present invention. An autoloader 208 for automatically transporting reticles includes a robot 212 having an arm 210 extending towards a inspection port 202 of a reticle inspection station 250. Arm 210 may rotate and extend towards an external port 204 when in its state denoted by reference number 210'. Similarly, when in its state denoted by reference number 210", the robotic arm can also extend towards a storage port 206 of a reticle stocker station 216 that typically includes several slots or tracks for storing reticles. The robotic arm is designed to further extend and retrieve a reticle 214 from reticle stocker station 216.

A typical inspection process, according to one embodiment of the present invention, may begin after reticle 214 is placed on external port 204, with the intention of storing the reticle in reticle stocker station 216 until it is used in a subsequent inspection application, for example. Robotic arm in its position 210' transports the reticle from external port 204 and stores it in a loading port of reticle stocker station 216 by extending as shown in FIG. 8. When the reticle is needed for production, for example, robotic arm 210" retrieves reticle 214 from the loading port and places it on inspection port 202 of reticle inspection station.

The reticle inspection station 250 is coupled with a computer system 252 where evaluation process 108 of FIG. 1 detailed above is carried out and it is determined whether the reticle has passed inspection. The computer system 252 may be integral to reticle inspection station 250 or separate from the inspection station 250. The reticle inspection station 250 receives design data 254 in the form of a list of figures, for example. Additionally, the computer system 252 receives image data (i.e., a test image) from the inspection station 250. The image data is analyzed by comparing it to a baseline image, which may be generated from the design data 254 or from the reticle 214. After the reticle inspection has concluded, reticle 214 is placed on external port 204 so that it may be carried to a fabrication facility for use, assuming of course, that it has passed inspection. Alternatively, the reticle 214 may be repaired or remade.

Suitable computer systems for use in implementing and controlling the methods in the present invention (e.g., controlling the settings of the various scanning apparatus components, storing and retrieving a baseline image of the reticle, storing a test image of the reticle, comparing the test image with the baseline image, storing the defects and statistical information during such comparisons, etc.) may be obtained from various vendors (e.g., Silicon Graphics of Mountain View, Calif. or Sun Mircosystems of Sunnyvale, Calif.) or custom built by a reticle inspection system vendor, such as KLA-Tencor.

The term "electronic representation" as used herein covers any machine readable representation. Typically, such representations are stored on magnetic, electronic, or optically readable media. The content of such representations may be transmitted as electrical signals, magnetic signals, electromagnetic signals, optical signals, etc.

Preferably, an optical, electron beam, or other inspection system is integrated with a computer system which implements many of the method steps of this invention. Such composite system preferably includes at least (a) a baseline image (preferably compacted) stored in memory, (b) an imaging system arranged to generate an optical or electron beam image of the reticle, and (c) a processing unit configured to compare the baseline and current test images and thereby identify defects, as well as compute and store various statistical information. At a minimum, the imaging system will usually include (i) a source of illumination oriented to direct radiation onto a specified location of the reticle; and (ii) one or more detectors oriented to detect an image of the reticle from the source which has been scattered by the reticle. The imaging system may also include a scanning means.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the collected statistical information may be utilized after the reticle is used to form patterns on a semiconductor wafer. That is, the statistical information may be used to correlate wafer statistical information, and hence separate the new errors introduced during wafer processing from the errors on the reticle. Accordingly, the present embodiments are to be considered as illustrative and not restrictive, and the invention is not to be limited to the details given herein, but may be modified within the scope and equivalents of the appended claims.

What is claimed is:

1. A method of inspecting a reticle defining a circuit layer pattern that is used within a corresponding semiconductor process to generate corresponding patterns on a semiconductor wafer, the method comprising:

providing a test image of the reticle, the test image having a plurality of test features each having one or more measurable test characteristic values;

providing a baseline image containing an expected pattern of the test image, the baseline image having a plurality of baseline features each having one or more measurable baseline characteristic values, wherein each measurable baseline characteristic value is expected to match a corresponding one of the measurable test characteristic value;

comparing at least a first subset and a second subset of the test characteristic values to their corresponding measurable baseline characteristic values such that a plurality of difference values are calculated for each pair of measurable test and baseline characteristic values; and during the comparison, collecting statistical information that is determined from at least a second subset of the measurable test characteristic values or the difference values resulting from the comparison, wherein the statistical information includes a standard deviation value of the second subset of the measurable test characteristic values and a median or average value of the second subset of the measurable test characteristic values as a function of a predetermined parameter.

2. A method as recited in claim 1, wherein the statistical information further includes the second subset of measurable test characteristic values and the second subset differs from the first subset of measurable test characteristic values which are compared to corresponding measurable test characteristic values.

3. A method as recited in claim 2, wherein the statistical information further includes a parameter selected from the group consisting of a maximum value, a minimum value, and a range value of the second subset of the measurable test characteristic values.

4. A method as recited in claim 2, wherein the first subset of measurable test characteristic values are in the form of edge position values and the second subset of measurable test characteristic values are selected from the group consisting of line width values, corner rounding values, transmission values, gate line width values, contact area values, and misalignment values.

5. A method as recited in claim 2, wherein the statistical information further includes the second subset of measurable test characteristic values as a function of a predetermined parameter.

6. A method as recited in claim 5, wherein the predetermined parameter is a position on the reticle.

7. A method as recited in claim 5, wherein the predetermined parameter is a feature density value of an area on the reticle.

8. A method as recited in claim 5, wherein the predetermined parameter is the reticle's corresponding process, and the standard deviation is determined for a plurality of reticles employed in the process.

9. A method as recited in claim 1, further comprising reporting an error for a selected one of the measurable test characteristic values if the selected measurable test characteristic value and the corresponding baseline characteristic value have an associated difference value that is more than a predetermined threshold.

10. A method as recited in claim 1, wherein the statistical information further includes a parameter selected from the group consisting of a maximum value, a minimum value, and a range value of the second subset of the measurable test characteristic values.

11. A method as recited in claim 10, wherein the average, maximum, minimum, range, median, and standard deviation values are correlated with a particular region of the reticle.

12. A method as recited in claim 11, wherein the average, maximum, minimum, range, median, and standard deviation values are further correlated with a feature density value of the particular region of the reticle.

13. A method as recited in claim 10, wherein the average, maximum, minimum, range, median, and standard deviation values are correlated with a particular process associated with the reticle.

14. A method as recited in claim 1, wherein the statistical information further includes a count of at least the second subset the measurable test characteristic values.

15. A method as recited in claim 10, wherein the measurable test characteristic values are selected from the group consisting of line width values, corner rounding values, transmission values, gate line width values, contact area values, and misalignment values.

16. A method as recited in claim 1, wherein the statistical information further includes the second subset of the measurable test characteristic values as a function of a predetermined parameter.

17. A method as recited in claim 16, wherein the predetermined parameter is a position on the reticle.

18. A method as recited in claim 16, wherein the predetermined parameter is a feature density value of an area on the reticle.

19. A method as recited in claim 16, wherein the predetermined parameter is the reticle's corresponding process, and the statistical information is collected for a plurality of reticles employed in the process.

20. A method as recited in claim 9, wherein the statistical information further includes a parameter selected from the group consisting of a standard deviation value, a maximum value, a minimum value, a range value, and a median or average value of the difference values.

21. A method as recited in claim 9, wherein the statistical information further includes a count of the difference values, a standard deviation value of such difference values and a median or average value of the difference values.

22. A method as recited in claim 20, wherein the measurable test characteristic values are selected from the group consisting of line width values, corner rounding values, transmission values, gate line width values, contact area values, and misalignment values.

23. A method as recited in claim 9, wherein the statistical information further includes the difference values as a function of a predetermined parameter.

24. A method as recited in claim 23, wherein the predetermined parameter is a position on the reticle.

25. A method as recited in claim 23, wherein the predetermined parameter is a feature density value of an area on the reticle.

26. A method as recited in claim 23 wherein the predetermined parameter is the reticle's corresponding semiconductor process, and the statistical information is collected for a plurality of reticles employed in the semiconductor process.

27. A method as recited in claim 1, wherein the measurable test characteristic values are selected from the group consisting of line width values, corner rounding values, transmission values, gate line width values, contact area values, and misalignment values.

28. A method as recited in claim 9, further comprising adjusting the predetermined threshold for portions of the test image based on the collected statistical information.

29. A computer readable medium containing program instructions for inspecting a reticle defining a circuit layer pattern that is used within a corresponding semiconductor process to generate corresponding patterns on a semiconductor wafer, the computer readable medium comprising:

computer readable code for providing a test image of the reticle, the test image having a plurality of test features each having one or more measurable test characteristic values;

computer readable code for providing a baseline image containing an expected pattern of the test image, the baseline image having a plurality of baseline features each having one or more measurable baseline characteristic values, wherein each measurable baseline characteristic value is expected to match a corresponding one of the measurable test characteristic value;

computer readable code for comparing at least a first subset and a second subset of the test characteristic values to their corresponding measurable baseline characteristic values such that a plurality of difference values are calculated for each pair of measurable test and baseline characteristic values;

computer readable code for during the comparison, collecting statistical information that is determined from at least a second subset of the measurable test characteristic values or the difference values resulting from the comparison, wherein the statistical information includes a standard deviation value of the second subset of the measurable test characteristic values and a median or average value of the second subset of the measurable test characteristic values as a function of a predetermined parameter; and a computer readable medium for storing the computer readable codes.

* * * * *